(12) United States Patent
Oliveros

(10) Patent No.: US 11,707,915 B2
(45) Date of Patent: Jul. 25, 2023

(54) ARC FLASH RESISTANT MULTILAYERED MATERIAL HAVING LOW THICKNESS

(71) Applicants: FONDAZIONE ISTITUTO ITALIANO DI TECNOLOGIA, Genoa (IT); ENEL PRODUZIONE S.P.A., Rome (IT)

(72) Inventor: Malena Esther Oliveros, Milan (IT)

(73) Assignees: FONDAZIONE ISTITUTO ITALIANO DI TECNOLOGIA, Genoa (IT); ENEL PRODUZIONE S.P.A., Rome (IT)

( * ) Notice: Subject to any disclaimer, the term of this patent is extended or adjusted under 35 U.S.C. 154(b) by 228 days.

(21) Appl. No.: 16/494,794

(22) PCT Filed: Mar. 7, 2018

(86) PCT No.: PCT/IB2018/051471
§ 371 (c)(1),
(2) Date: Sep. 17, 2019

(87) PCT Pub. No.: WO2018/172874
PCT Pub. Date: Sep. 27, 2018

(65) Prior Publication Data
US 2020/0276789 A1 Sep. 3, 2020

(30) Foreign Application Priority Data
Mar. 20, 2017 (IT) .................. 102017000024968

(51) Int. Cl.
*B32B 5/26* (2006.01)
*B32B 25/02* (2006.01)
(Continued)

(52) U.S. Cl.
CPC .............. *B32B 5/26* (2013.01); *B32B 25/02* (2013.01); *B32B 25/10* (2013.01); *B32B 25/20* (2013.01);
(Continued)

(58) Field of Classification Search
CPC ............. A41D 19/0065; A41D 19/015; A41D 19/01529; A41D 31/265; B32B 3/26;
(Continued)

(56) References Cited

U.S. PATENT DOCUMENTS

2004/0229043 A1* 11/2004 Spohn .................... B32B 27/12
428/421
2007/0094763 A1 5/2007 Silver
(Continued)

FOREIGN PATENT DOCUMENTS

CN 102827475 A * 12/2012
DE 102006056645 A1 * 6/2008 ............. H01B 7/292
(Continued)

OTHER PUBLICATIONS

English machine translation of the description of DE-102006056645-A1, obtained from ESPACENET (Year: 2008).*
(Continued)

*Primary Examiner* — Lee E Sanderson
*Assistant Examiner* — Thomas J Kessler
(74) *Attorney, Agent, or Firm* — Lucas & Mercanti, LLP

(57) ABSTRACT

A multi-layered material with low thickness is provided, having properties of thermal and electric insulation, flame retardant capacity and high mechanical strength, useful for the manufacture of personal protective equipment and more in general of work items for the protection against arc flash effects. The material provides a high grade of protection
(Continued)

against arc flash with good flexibility and comfort for the wearer, who is thus protected without being hindered in movements.

6 Claims, 5 Drawing Sheets

(51) Int. Cl.
*B32B 25/10* (2006.01)
*B32B 25/20* (2006.01)
*A41D 19/00* (2006.01)
*A41D 19/015* (2006.01)

(52) U.S. Cl.
CPC .... *A41D 19/0065* (2013.01); *A41D 19/01529* (2013.01); *B32B 2262/0269* (2013.01); *B32B 2262/0276* (2013.01); *B32B 2264/101* (2013.01); *B32B 2264/102* (2013.01); *B32B 2307/3065* (2013.01); *B32B 2437/02* (2013.01)

(58) Field of Classification Search
CPC .... B32B 5/22; B32B 5/24; B32B 5/26; B32B 7/02; B32B 25/02; B32B 25/10; B32B 25/14; B32B 25/20; B32B 2250/02; B32B 2250/04; B32B 2250/20; B32B 2250/42; B32B 2255/02; B32B 2255/24; B32B 2255/26; B32B 2260/021; B32B 2260/023; B32B 2260/048; B32B 2262/0269; B32B 2262/0276; B32B 2264/101; B32B 2264/102; B32B 2307/20; B32B 2307/206; B32B 2307/212; B32B 2307/304; B32B 2307/306; B32B 2307/3065; B32B 2307/54; B32B 2307/554; B32B 2307/581; B32B 2307/732; B32B 2437/02; B32B 2571/00
See application file for complete search history.

(56) References Cited

U.S. PATENT DOCUMENTS

| | | | |
|---|---|---|---|
| 2008/0176065 | A1 | 7/2008 | Hirschmann et al. |
| 2011/0138523 | A1 | 6/2011 | Layson et al. |
| 2011/0262704 | A1 | 10/2011 | Rock et al. |
| 2016/0058083 | A1 | 3/2016 | Palese et al. |

FOREIGN PATENT DOCUMENTS

| | | | | |
|---|---|---|---|---|
| DE | 102006056645 | A1 | 6/2008 | |
| EP | 2471986 | A1 | 7/2012 | |
| GB | 2020305 | A | 11/1979 | |
| WO | 2008096262 | A1 | 8/2008 | |
| WO | WO-2008096262 | A1 * | 8/2008 | ............... B32B 7/12 |

OTHER PUBLICATIONS

English machine translation of the claims of DE-102006056645-A1, obtained from ESPACENET (Year: 2008).*
Gaan, S et al., Flame retardant functional textiles, 2011, Woodhead Publishing Limited, pp. 98-129 (Year: 2011).*
International Search Report and Written Opinion for Corresponding International Application No. PCT/IB2018/051471 (12 Pages) (Jul. 2, 2018).

* cited by examiner

ARC FLASH RESISTANT MULTILAYERED MATERIAL HAVING LOW THICKNESS

CROSS-REFERENCE TO RELATED APPLICATIONS

This application is a 371 of PCT/IB2018/051471, filed Mar. 7, 2018, which claims the benefit of Italian Patent Application No. 102017000024968, filed Mar. 20, 2017.

FIELD OF THE INVENTION

The present invention relates in general to the field of the composite materials, and more precisely it relates to a new multi-layered material that, for its peculiar characteristics of electric and thermal insulation, for its high mechanical strength, and specifically for its ability to protect against arc flash, is useful in the manufacture of personal protective equipment and more in general of work items for the protection of workers during their activities carried out under electric voltage (low voltage).

STATE OF THE ART

Working on electrical systems is governed by increasingly stringent laws and technical regulations, aimed at eliminating, or at least reducing, any risk situation for the worker. Where risks cannot be completely eliminated through prevention, the existing rules are aimed at risk control through the adoption of strict procedures and of well-established work methods, as well as by means of the use of special equipment and personal protection equipment.

In situations of electrical risk, the protective equipment and devices include in particular visors embedded in the helmet, insulating rubber boots, insulating gloves and clothing resistant to electrical risks, intended to be worn by workers, but also carpets, tube covers and various equipment coated with insulating materials. An electrical hazard situation recognized as particularly dangerous for workers is that of the arc flash, where "arc flash" means a continuous high-voltage electrical discharge between two conductors, which produces intense heat and a very strong light. This is a potentially very dangerous phenomenon for the worker who is nearby, sometimes lethal, and it is particularly insidious because it is an accidental phenomenon, due to overvoltage, to the presence of corroded parts or impurities on surfaces of electrically active parts, and therefore unexpected. The development of heat following the arc flash can cause severe burns, but also mechanical damages due to the explosion of rapidly heated air or also chemical damages due to the vaporization of metals that can generate toxic fumes or sprinkles of molten metals. The intense emission of ultraviolet rays and the abrupt variations of pressure due to the phenomenon of the arc flash can also cause sudden movements of the worker, with possible hits and falls. Even fractures and intoxications can therefore be among the harmful effects caused by the arc flash, although burns remain the main damage caused, and the most common.

The insulating protective devices in rubber and leather currently in use are certainly useful devices for the personal protection of the worker subjected to electrical risk, but the coupling of the two materials results in a high final thickness of the device. Therefore, on one hand the worker acquires a greater degree of safety against the risk of electric shocks and burns; but on the other hand, he loses much in handling, comfort and ease of use of the devices themselves. When the device is a glove, this is particularly risky because it increases the risk of accidents rather than preventing them. For example, there exist on the market arc flash gloves just having this type of drawback: they are uncomfortable and have a low manoeuvrability and breathability.

On the other hand, different models of thin, more comfortable protective gloves are on the market, but they do not offer any guarantee of safety against the risk from arc flash to the wearer. In this regard, Table 1 below shows the maximum thickness values according to the regulatory standards that are required to obtain the appropriate flexibility of insulating gloves for each ASTM class foreseen for this type of protection device:

TABLE 1

| | Thickness (mm) | | |
|---|---|---|---|
| Class | Insulating gloves | Composite gloves with leather | Composite long gloves with leather |
| 00 | 0.50 | 1.8 | — |
| 0 | 1.00 | 2.3 | — |
| 1 | 1.50 | — | 3.1 |
| 2 | 2.30 | — | 4.2 |
| 3 | 2.90 | — | 4.2 |
| 4 | 3.60 | — | — |

As shown above in Table 1, the ASTM classification classifies all commercial rubber insulating gloves in classes from 00 to 4, where insulating gloves for use in low-voltage installations are included in classes 00 and 0, while in classes 1 to 4 are those for use in high voltage systems. The current safety rules also provide that, to ensure the correct mechanical protection against cuts, abrasions and punctures, in addition to insulating gloves for protection against electrical risk, leather gloves are always worn over insulating gloves, with a further increase in the thickness and even lower manoeuvrability.

WO 2008/096262 discloses a laminated material having properties of thermal insulator comprising a silicone-based adhesive, and a method for the preparation thereof.

US 2004/0229043 discloses a multi-layered composite material having a first protective polymeric layer of a fluoropolymer composition and a second polymeric layer without fluoropolymers.

Therefore, up to now, as far as the Applicants are aware, the technical problem remains unresolved of having available materials for the production of personal protection equipment that are really effective in protecting workers in situations of arc flash risk, and that can be also processed in articles of reduced thicknesses, so that they can also be used for the production of thin coatings or gloves without this equipment losing their manageability and comfort of use.

SUMMARY OF THE INVENTION

Starting from the above said problems, the Applicants have now found a new multilayer material able to combine the need for complete safety in situations of electrical risk, in particular the arc flash risk, with the need for a reduced thickness of the material so that it can also be used, for example, to create protective coatings or to produce personal protective equipment, such as gloves, without limiting the flexibility and manageability of the equipment itself.

The new multilayer material of the present invention, also when produced in a low thickness, actually shows surprising properties, able to meet the mechanical, thermal and electrical requirements mentioned above: in particular the material of the invention showed to possess high mechanical strength to cuts, punctures, abrasions, tears, and high tensile and elongation strength. It also meets optimally the thermal resistance requirements showing thermal insulation ability and delay in the transmission of heat due to exposure to the flames. Finally, it possesses excellent protection properties against the arc flash effects.

Moreover, thanks to the low thickness, the multilayer material of the invention has proved to be useful for preparing a coating on any kind of personal protection equipment or device intended for the protection of workers in situations of electrical risks, in particular for the protection against arc flash.

A further particularly advantageous aspect of the present material is that it can be manufactured by means of a very easy process, starting from low cost materials that are largely available.

It is therefore a subject of the present invention a multi-layer material, as defined in the first of the claims herein.

A process for the preparation of the above said material, its use for the coating and/or for the manufacture of articles for the protection from electrical risks, in particular the arc flash risks, and the so obtained articles, as defined in the subsequent independent claims herein, are a further subject of the present invention.

Further important features of the present multilayer material, of the process for its preparation and of its use according to the invention, are reported in the following detailed description.

DETAILED DESCRIPTION OF THE INVENTION

Figure 1:
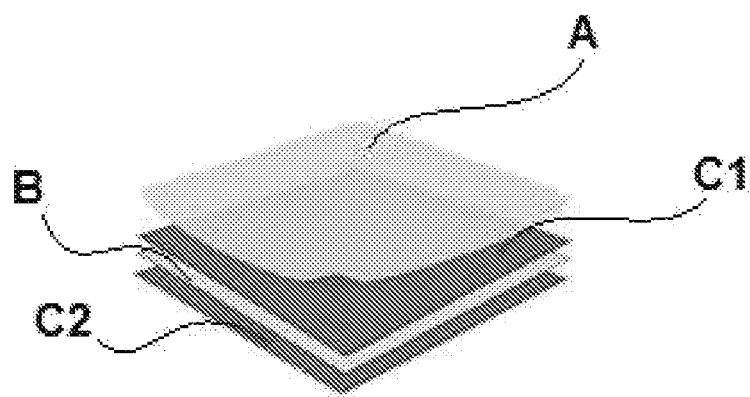
FIG. 1: schematic representation of the multilayer structure of the invention material, in a preferred embodiment thereof.
Figure 1A:
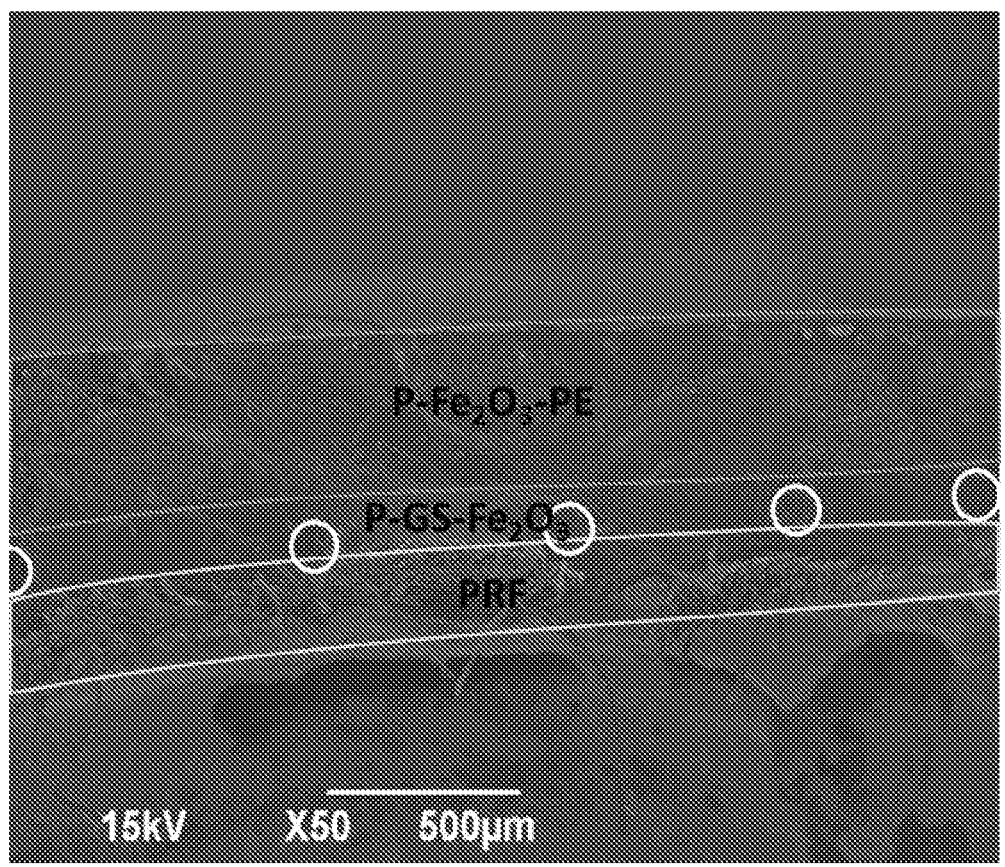
FIG. 1a: sectional image of the material of Example 1 taken by a scanning electron microscope, wherein are visible a fabric layer of aramidic fibres (PRF), a layer of silicone rubber containing iron (III) oxide and hollow glass spheres (P-$Fe_2O_3$-GS), a layer containing silicone rubber, iron (III) oxide and polyester fibre (P-$Fe_2O_3$-PE)

The multilayer material of the invention has a thickness lower than 1 mm, preferably lower than 0.8, more preferably lower than 0.75 mm, and it comprises a fabric substrate of para-aramid fibres, a fabric layer of flame retardant fibres, preferably consisting of flame retardant polyester fibres, and a silicone rubber layer, and it further comprises a further layer of silicone rubber, intermediate between the two layers of fibrous fabrics and comprising hollow glass microspheres and iron (III) oxide micropowder incorporated in the polymeric matrix consisting of the silicone rubber layer.

In a particular aspect of the present invention, in the final multi-layered material the ratio between the polymeric matric and the fabrics, each overall intended as referred to all the layers present respectively of polymeric matrix and of fabric, may vary between 1.1 and 2.4.

The amount of iron (III) oxide in the form of a micro-powder and the amount of hollow glass microspheres are for example comprised between 1 and 5% and respectively between 1 and 6% by weight with respect to the total weight of the layer wherein they are incorporated, i.e. for 100 g of silicone of the outer layer or of the intermediate layer, for example, 1 to 5 g of iron (III) oxide are used, while for 100 g of silicone in the intermediate layer 1 to 6 g of hollow glass microspheres are used. In this invention, by "micro-powder" of iron (III) oxide a powder of $Fe_2O_3$ is meant wherein the oxide particles preferably have average diameter size smaller than 5 μm. The hollow glass microspheres added to the intermediate layer of silicone rubber typically have diameter smaller than 150 μm.

According to a preferred embodiment of the invention, corresponding to an optimum thickness of the material while retaining all the strength features herein described, the amount of silicone rubber used may vary in the range between 24 and 26% by weight, more preferably is of about 25% by weight, whereas the thickness of the fabric layer of flame retardant fibres is 0.22±0.01 mm and the thickness of the fabric layer of aramidic fibres is 0.07±0.01 mm.

According to a particular embodiment, for 100 g of silicone rubber in the outer layer 5 g of iron (III) oxide are used, while for 100 g of silicone rubber of the intermediate layer 5 g of iron (III) oxide are used and 6 g of hollow glass microspheres.

In the present invention, if not specified otherwise, the percentages of a component in a composite material are meant as weight percentages with respect to the total weight of the material itself.

According to a particularly preferred embodiment of the present invention, the multilayer material of this invention preferably has a thickness comprised between 0.60 and 0.75 mm, these values allowing the material to exert an optimal protection against arc flash maintaining at the same time the best flexibility and manageability. At such values of the thickness, the present material can be classified between 00 and 0 according to the parameters of the ASTM classification in Table 1 above, but it possesses a protection ability comparable to that of the insulating gloves coupled with leather gloves with a thickness between 1.8 and 2.3.

With reference to the FIG. 1 here attached, an embodiment is schematically represented of the multi-layered structure of the present material, wherein A indicates the fabric substrate of para-aramid fibres, B indicates the layer of flame retardant fabric, whereas C1 and C2 respectively indicate the intermediate silicone rubber layer comprising glass microspheres and iron (III) oxide micropowder, and the outer layer of silicone rubber and iron (III) oxide micropowders.

In the present invention, by silicone rubber a single-component silicone rubber is meant, whose curing process starts at room temperature without need of a curing agent. Preferred are the silicone rubbers that are self-levelling and have good mechanical properties once cured, for example a silicone rubber with a viscosity of about 350,000 mPa s known with the tradename Elastosil®.

The two fabric layers A and B are typically biaxial fabrics, i.e. each consists of two parallel layers of woven fibres.

As described in detail in the following experimental part, inventors have found that this multilayer material has good mechanical characteristics in terms of resistance to abrasion, breakage, punctures and cuts, and at the same time it has an equally good thermal resistance in terms of heat transmission by contact, convection and radiation, and in terms of resistance to molten metal sprinkles.

Furthermore, as described in detail in the following, the present material is classifiable as a material of class 2 according to the Stoll classification criteria of the materials thermal performances towards arc flash. Moreover, the same material was proved resistant against arc flash in open environment with an index ATPV (Arc Thermal Performance Value) experimentally determined, as described in detail in the following, within the values acknowledged by the law regulations to guarantee protection against arc flash. The present material is therefore suitable for the use in the manufacture of personal protection equipment against arc flash.

Thanks to its reduced thickness and to the flexibility showed, this material has proved particularly suitable for the manufacture of gloves and of any other articles or protection devices, which require flexibility of the material and manageability of the wearer.

Articles and protection devices, in particular gloves, are manufactured with the present multilayer material so that the silicone rubber layer faces outwards, whereas the fabric substrate of para-aramid fibres constitutes the inner layer. According to a preferred embodiment of the material of the invention, particularly suitable for the manufacture of protection devices intended for being in contact with a wearer's skin, the material defined above further comprises at least a further polymeric layer on the fabric substrate of para-aramid fibres, so as to further increase the comfort and softness of the innermost layer in contact with the skin.

More in general, it is meant that the multilayer material of the invention, thanks to its reduced thickness, can also be used for coating surfaces, equipment and protection devices made of other materials non-protective against arc flash, to provide them with this kind of protection.

Besides the multilayer material and the protection devices made with it, described above, subject of this invention is also a process for the preparation of the multilayer material, particularly advantageous because it is simple to carry out and it uses starting materials that are easy to find on the market at low cost. The present process for the preparation of the multilayer material of the invention comprises the following steps:

i) preparing a solution of a single-component silicone rubber, curable at room temperature, in an organic solvent thereof, adding iron (III) oxide micro-powder, transferring a first half of the so obtained solution in an open container having width and length equal to those of the sample material to be prepared;

ii) positioning in the container of step i) above, a fabric of flame-retardant fibres to cover said first half of the solution;

iii) adding to a second half of the solution obtained in step i) above, glass hollow microspheres, followed by mixing and transferring of the so obtained mixture on said flame-retardant fabric of step ii);

iv) partially evaporating said organic solvent from said container by air drying;

v) positioning a fabric of para-aramid fibres to cover the underlying layers, and completing the evaporation of the solvent.

Figure 2:
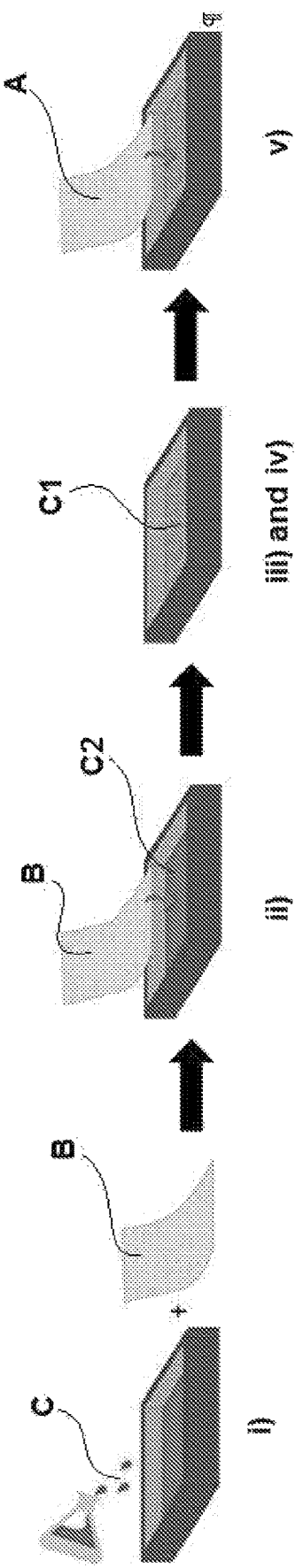
FIG. 2: schematic illustration of the main steps of the process for the preparation of the multilayer material illustrated in FIG. 1, according to this invention.

The process for the preparation of the present multilayer material is schematically illustrated in the attached FIG. 2 too, wherein A, B and C respectively indicate the fabric of para-aramid fibres, the flame retardant fabric and the silicone rubber solution, whereas C1 and C2 indicate respectively the intermediate layer of silicone rubber comprising hollow glass microspheres and iron oxide micropowder and the outermost layer of silicone rubber comprising the iron oxide micropowder.

The preparation of the solution in step i) is carried out by well stirring the solution after having added the iron (III) oxide micropowder, for instance by an ultrasonic sonicator, with agitation until complete dispersion of the micropowder. The thus obtained solution takes on a red coloration from the ferric oxide colour, and it is then divided into two parts. In the step iii) of the present process, to a half of the solution the hollow glass microspheres are added, whose dispersion in the silicone rubber may be assisted by simple mechanical agitation.

Both the fabric of para-aramid fibres and the fabric of flame retardant polyester fibres, which is the flame retardant fabric preferably used in this invention, are products largely available on the market. As well as the above said fabrics, also the silicone rubbers are products easily available on the market, at low costs. Inventors have also observed that the fabrics in question have an excellent compatibility with the silicone rubbers, wherein by "compatibility" is meant a good ability of the fabric to be impregnated with the elastomer, good adhesion and stability of the multilayer obtained. Therefore, with the simple process described above it was possible to prepare a stable multilayer material, well compact without addition of any adhesives or crosslinking agents.

The following experimental examples are given as a non-limiting illustration of the present invention.

Example 1

Production of the Multilayer Material of the Present Invention 130 g of silicone rubber Elastosil® E43 (Wacker Chemie AG, viscosity 350,000 mPa s) was dissolved in 400 ml of heptane. To this polymeric solution having a final volume of 530 mL were added 6.5 mg of iron (III) oxide in powder (granulometry lower than 5 μm and purity 99%, marketed by Sigma Aldrich); the so obtained final solution was of an intense red colour and has final viscosity of 7.28 μPa·s. Half of the obtained solution was transferred in a container suitable for the preparation of the multilayer having the desired size, that is in the present case in a container of size 40×60 cm. On this solution was placed a fabric substrate of flame retardant polyester with size 35×55 cm, having a specific weight lower than 135 g/m²±5% (marketed by Cometex S.r.l.).

Half of the remaining volume of organic solution of silicone rubber was added with 7.8 mg of glass microspheres with diameter 75 μm<d<150 μm E-SPHERES® (manufactured by Omega Minerals Germany GmbH), then it was put under mechanical agitation. The so obtained mixture was transferred on the flame retardant polyester fabric and let to rest in the air for 30 minutes thus obtaining a partial evaporation of the organic solvent, and the start of the elastomer crosslinking. Only at this point a fabric substrate of para-aramid fibres, having specific weight lower than 60 g/m²±5% (marketed by G. Angeloni S.r.l.), of the same size of the previous one was placed thereon. The solvent evaporation was brought to the end in the air, in order to complete the elastomer curing.

It was so obtained a sample of multilayer material of size 35×55 cm and thickness 0.64±0.04 mm. This final material, that was moreover flexible and comfortable to the touch, consisted by 49% of silicone rubber, by 40% of para-aramid fibres and polyester, by 6% of glass spheres and by 5% of iron oxide micropowder.

Example 2

Experimental Test on the Multilayer Material of the Invention

Figure 3:
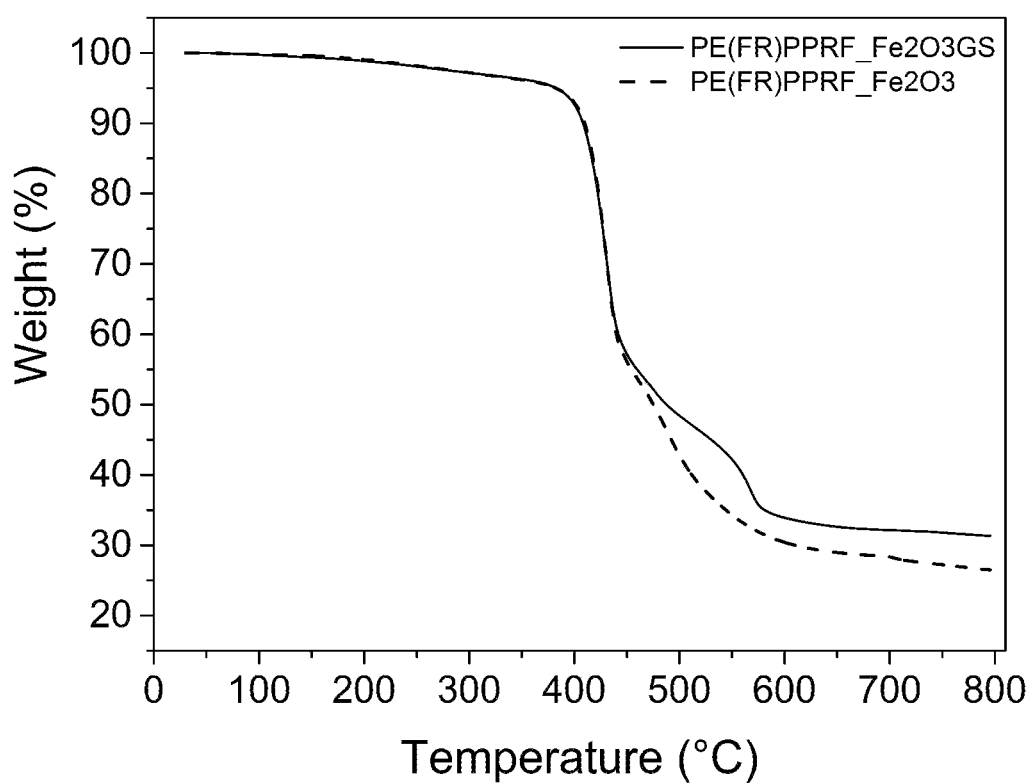
FIG. 3: thermogravimetric analysis (TGA) as a function of the temperature of the multilayer material of the invention with hollow glass spheres, PE (FR) PPRF_Fe2O3GS (continuous line) and, as a comparison reference, of the same material without hollow glass spheres, PE (FR) PPRF_Fe2O3 (dotted line)
Figure 4A:
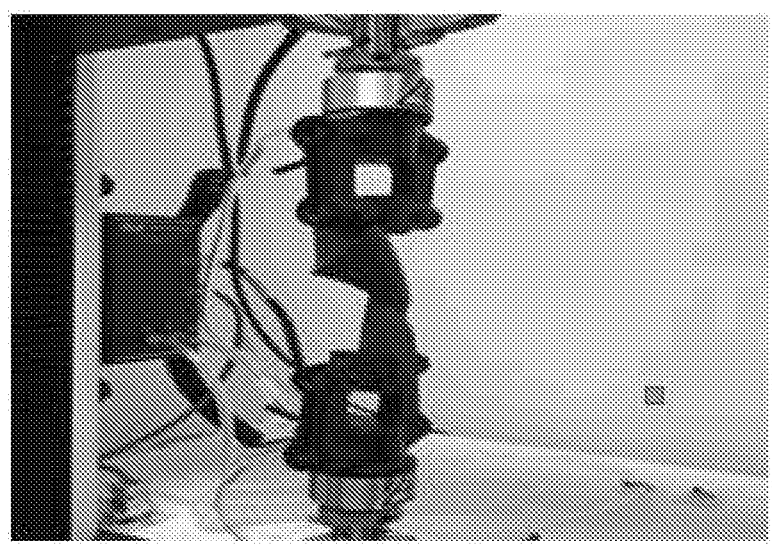
FIG. 4: (A) image illustrating the tear strength test described in the following Example 2, and (B) values in Newton of the tear strength for the material of the invention with glass hollow spheres (PE(FR)PPRF-$Fe_2O_3$GS) and, as a comparison reference, for a same material without hollow glass spheres (PE(FR)PPRF-$Fe_2O_3$. The dotted line (a) corresponds to the minimum value of the tear strength (25N) of the level 2 as defined in the related law regulations.
Figure 4B:
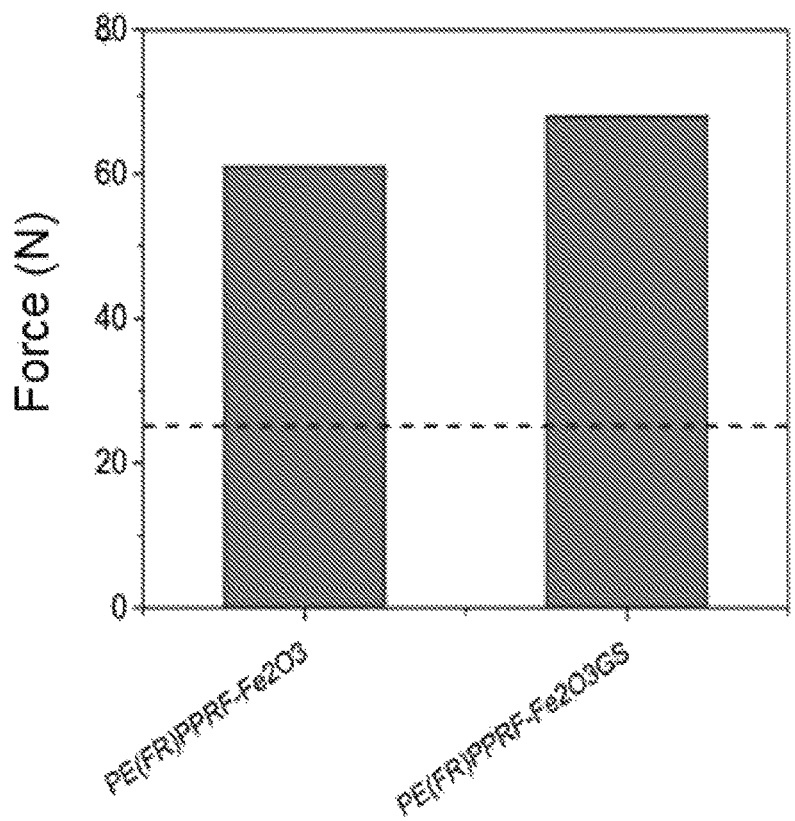
Figure 5A:
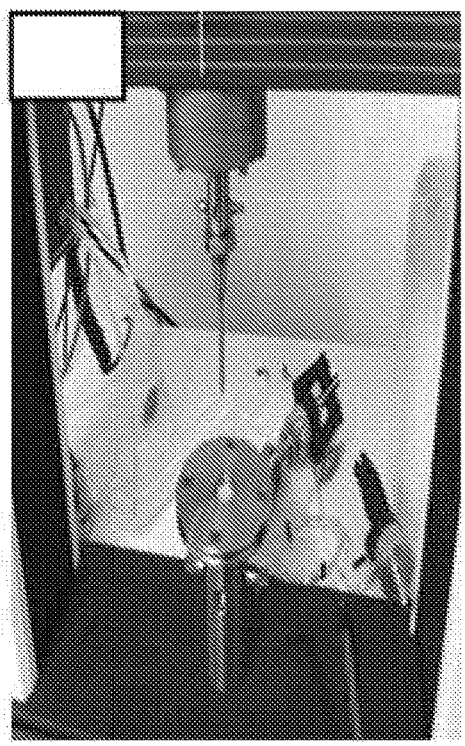
FIG. 5: (A) image illustrating the puncture strength test described in the following Example 2, and (B) values of the puncture strength for the material of the invention having hollow glass spheres (PE(FR)PPRF-$Fe_2O_3$GS) and, as a comparison reference, for a same material without hollow glass spheres (PE(FR)PPRF-$Fe_2O_3$). The dotted line corresponds to the minimum value in Newton of the puncture strength (60N) defined for the level 2 in the related law regulations.
Figure 5B:
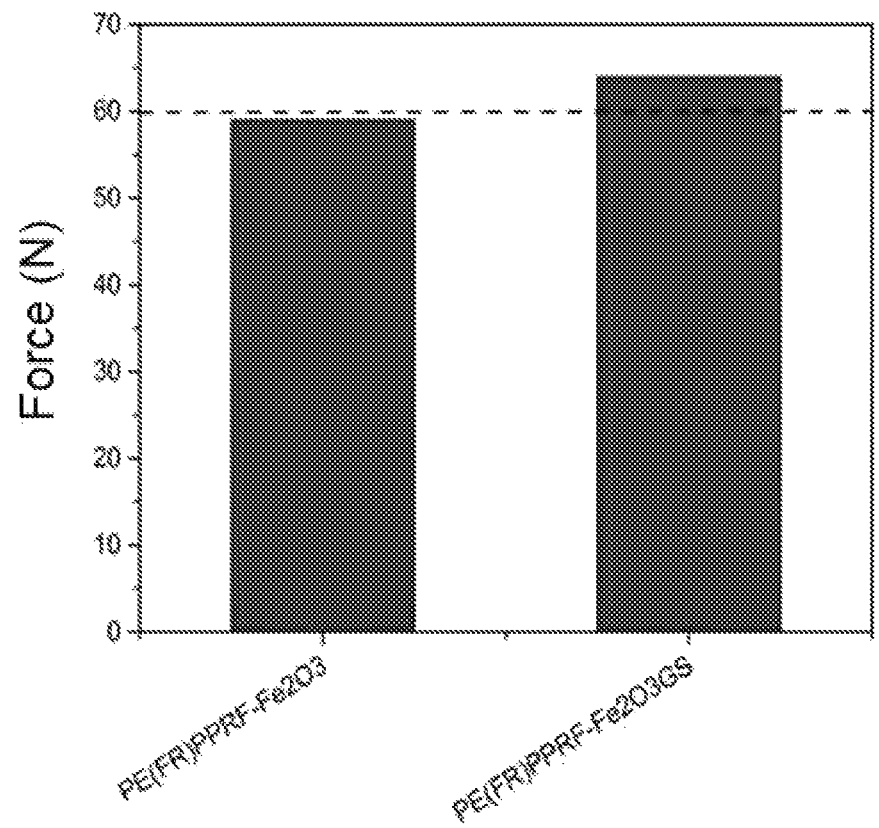

The sample of material prepared as described above in Example 1 was tested in various experiments in order to characterize its features that are relevant for the protection against electrical, thermal and mechanical risks, as described in the following. Furthermore, a thermogravimetric analysis was carried out on this material, in parallel with a sample of the same material free from glass microspheres, at the aim of evaluating the thermal stability and more in general the behaviour at different temperatures with respect for instance to the resistance to degradation. As it can be seen in FIG. 3, a lower degradation of the material of the invention was observed (continuous line) at high temperatures (approximately at temperatures higher than 500° C.), with respect to the reference material without glass microspheres (dotted line).

Assessment of the Flame Resistance

The sample of the material obtained in the Example 1 has showed a flame time shorter than 15 seconds in the following laboratory test.

Two rods with four aluminium crocodile connectors were placed on a laboratory support bench, to which the sample of material under examination was fixed at its four corners, keeping it taut. A Bunsen burner flame with propane gas was then brought closer to the centre of the sample surface, leaving the flame still in place for 10 seconds and then timing with a chronometric instrument the flammability time of the sample.

Certification Test of the Material

The invention material prepared as described above in the Example 1 was tested in various tests for the certification of conformity of the material to the classes of thermal and mechanical resistance according to the current law regulations, in an accredited laboratory for carrying out such tests at Centro Tessile Cotoniero e Abbigliamento SpA, Busto Arsizio (VA), Italy.

In particular, by means of an Instron equipment for universal test of mechanical strength, the material's strength was tested in various tests of strength towards the different kinds of mechanical risk indicated in the following Table 2, together with their respective results and with the performance levels indicated by the law regulation EN 388 for that result.

TABLE 2

| Kind of mechanical strength tested | Strength detected data | Performance level of the invention material according to EN388 |
|---|---|---|
| Abrasion strength (cycles) | 2000 cycles | 3 |
| Blade cutting resistance (index) | Average index: 1.5 | 1 |
| Tear strength (Newton) | >75 N | 5 |
| Puncture strength (Newton) | 71 N | 2 |
| Tensile strength (Newton) | 2100 N | 2 |

The abrasion resistance was measured as cycles required to completely abrade the surface of the material sample, following the test method EN388:2004 Par 6.1. The test equipment was Martindale, the size of the tubes was 38 cm of diameter, the applied pressure was of 9 kPa, the abrasion agent was Klingspor PL31B gritt 180. The end of the test coincided with the first hole. The blade cutting resistance was indicated by an index calculated based on the number of passages of a blade at constant speed on the material surface, necessary to cut the material.

The test method applied was that reported in the law regulation UNI EN 388:2004 Par 6.2 providing a conditioning of the samples for 24 hours at 23° C. with 50% of U.R. The tear strength indicates the force required to tear the material, and it was measured by application of the test method UNI EN388:2004 Par 6.3 using as an equipment a dynamometer and conditioning the samples for 24 hours at 20° C. with 50% of U.R. The speed of applied traction in the test was of 100 mm/min, the size of the samples was of 100×50 mm, the distance between the clamps of 50 mm.

The puncture strength indicates according to the tests carried out the force necessary to drill the sample of material with a steel tip of 1 mm of diameter. The regulation followed was the UNI EN 388:2004 par 6.4. The equipment used was a dynamometer and the speed of the test was 100 mm/min. The samples had circular shape with a diameter of 40 mm and the conditioning was carried out for 24 hours at 23° C. with 50% of U.R.

The tensile strength is indicated at the maximum tensile force applied to the material sample causing the breaking, and the test is carried out following the regulation UNI EN ISO 13934-1:2013 using a dynamometer and conditioning the samples of size 200×50 mm for 24 hours at 20° C. with 65% of U.R. The test speed was 100 mm/min with no pretension applied.

The invention material prepared according to what disclosed in Example 1 was then tested in resistance tests to different kinds of thermal risk indicated in the Table 3 below, together with the respective results and the performance levels provided by the law regulation EN 407 for that given result.

TABLE 3

| Kind of thermal resistance tested | Resistance detected data | Performance level of the invention material according to EN 407 |
|---|---|---|
| Resistance to limited flame propagation (seconds) | <2 seconds | 4 |

TABLE 3-continued

| Kind of thermal resistance tested | Resistance detected data | Performance level of the invention material according to EN 407 |
|---|---|---|
| Resistance to heat by contact (seconds) | 21 seconds | 1 |
| Resistance to heat by convection (seconds) | >10 seconds | 3 (B2) |
| Resistance to radiant heat (seconds) | >17 seconds | 1 (C1) |
| Resistance to small sprinkles of molten metal (number of droplets) | Number of droplets >25 | 3 |

The limited flame propagation is carried out following the method UNI EN ISO 15025:2003 Met. A. A flame defined, coming from a burner is applied for 10 seconds to the surface or to the lower edge of the samples, vertically oriented. The information on the flame dispersion and on the residual incandescence is recorded, as well as the information on the formation of debris, burning debris or of a hole. The flame persistence time and the time of residual incandescence are recorded. The samples of size 200×160 mm are conditioned for 24 hours at 20° C. and with 65% of U.R.

The determination of heat transmission by contact is carried out according to the UNI EN 702: 1996 method which involves the use of a calorimeter and of a heating cylinder with circular samples of 80 mm diameter conditioned for 24 hours at 20° C. and 15% of U.R. The heating cylinder is heated up to the contact temperature (250° C.) and the specimen is placed on the calorimeter. The heating cylinder is lowered on the specimen supported by the calorimeter at a constant speed (5 mm/min). The time limit is determined by controlling the calorimeter temperature.

The transmission of heat by convection was determined according to the regulation UNI EN 367:1993. A specimen horizontally oriented was subjected to a thermal flow of 80 kW/m$^2$ emitted from a flame of a gas burner connected thereunder. The heat was measured by a calorimeter placed over the specimen. The Heat Transfer Index HTI was calculated based on time in s to obtain an increase in temperature of 12 or 24° C. of the calorimeter. The gas used for the test was butane. The specimen size was 14×14 cm and it was conditioned for 24 hours at 20° C. with U.R. of 65%.

The transmission of the radiant heat was determined according to the regulation UNIEN ISO 6942:2004 Met. B. A specimen attached to a frame was exposed to a radiant heat source (electrically heated silicon carbide bars). The RHTI Heat Transfer Index was calculated based on the time in s to obtain a temperature increase of 12 and 24° C. of the calorimeter. The specimen dimensions are 23×8 cm and are conditioned for 24 hours at 20° C. with U.R. 65%.

The resistance to contact with small sprinkles of molten metal was determined following the regulation UNI EN 348-1993. By projection of droplets on the surface of a specimen placed vertically it was measured the number of droplets necessary for causing an increase of temperature of 40 K in the calorimeter placed behind the material. The specimen size was of 120×20 conditioned for 24 hours at 20° C. with an U.R. of 65%.

Assessment of the Electric Insulation Properties and of the Resistance to High Voltage Laboratory tests were carried out to assess the ability of electric insulation of the material obtained in the Example 1, as follows.

In order to test the electric insulation a current was let to pass with a tester for small distances (1 cm) without measuring a current passage.

For resistance to high voltage, a capacitor consisting of two copper plates was placed in series with a high voltage generator (maximum voltage up to 30 KVolt). Between the plates of this capacitor the sample of material of the invention was positioned: for voltages around 20 KVolt no change or break of the dielectric material was observed, even for working times of about 2 hours.

In these tests no current was detected, to indicate the ability of electric insulation of the material.

For the same material inventors have also studied, always on a laboratory scale, the properties of resistance to high voltages as a function of time, monitoring the sample of material following the application of a voltage around 20 kV in direct current. These experiments showed that the material was stable even when subjected to these critical conditions for at least 2 hours; no visible sign of degradation of the sample was observed, which also kept its intrinsic mechanical properties.

Assessment of the Resistance Against Arc Flash

The invention material, prepared as described in the Example 1, was then tested against arc flash in the following two experiments.

The first test was carried out in the certification laboratory of the company ArcWear, in Louisville, USA, according to the standard procedure described in Live working—Protective Clothing Against the Thermal Hazard of an Electric Arc in IEC 61482-1-1:2009. On three panels, radially arranged, equidistant from an electrode placed at the centre, were set as many samples of the material under examination. Each panel was connected to a high-energy discharge generator. The values obtained from the tests have showed the absence of flash of the material up to 51 cal/cm$^2$ ATPV.

The second test was carried out in the certification laboratories of the company Centro Tessile Cotoniero e Abbigliamento SpA, Busto Arsizio (VA), Italy, and it was aimed at determining the class of protection against arc flash of the material, using the test method of the arc forced and direct in the test chamber (according to the regulation CEI-EN 61482-1-2:2008 par 5.4.1). The material proved to be conform to the class II/7KA according to the product regulation IEC 61482-2:2009.

Example 3

Manufacture of a Protection Glove with the Multilayer Material of the Invention

A protection glove was manufactured at the premises of the company Molinari Guanti S.r.l. in Modena, Italy, with the material prepared as described in the Example 1. After the glove was manufactured by stitching pieces of appropriately cut pieces of the material, the seams were insulated by applying the polymeric solution with iron oxide (III) onto the seams and leaving the piece at rest for curing.

In this way, the glove has been waterproofed from the introduction of water, as required by the dielectric strength certification tests to which protective gloves are subjected when they are intended for use under electric tension. The glove thus produced was also mechanically resistant, thermally resistant and resistant against arc flash to the same extent as the material itself, since it was manufactured with the material and the seams were treated with the same polymer solution with iron oxide (III).

The present invention has been described herein with reference to a preferred embodiment thereof. It is meant that there may be other embodiments all belonging to the same inventive core, as defined by the scope of protection of the claims listed in the following.

The invention claimed is:

1. A protective multi-layered material against arc flash, consisting of:
    a fabric layer of para-aramid fibres (A), surmounted by a fabric layer of polyester flame-retardant fibres (B), and
    a layer of silicone rubber (C2) incorporating therein micro-powder of iron (III) oxide, said layer (C2) being disposed on a side of said fabric layer (B) opposite from said fabric layer (A),
    a further layer of silicone rubber (C1), intermediate said two layers of fibrous fabrics (A) and (B), and incorporating therein glass hollow microspheres and micro-powder of iron (III) oxide incorporated in said further layer of silicone rubber (C1),
    said multi-layered material having a thickness lower than 1 mm,
    wherein said glass hollow microspheres are incorporated in said layer (C1) in amount comprised of about 6% by weight with respect to the total weight of the layer wherein they are incorporated,
    wherein said iron (III) oxide micro-powder is incorporated in said layer (C1) and in said layer (C2) in an amount comprised of about 5% by weight with respect to the total weight of the layers wherein they are incorporated,
    wherein said glass hollow microspheres have a diameter size lower than 150 μm, and
    wherein said iron (III) oxide particles in both layers of silicone rubber (C2 and C1) have average diameter size lower than 5 mm.

2. The multi-layered material according to claim 1, having a thickness comprised between 0.60 and 0.75 mm.

3. The multi-layered material according to claim 1, having a protection value against arc flash ATPV higher than 45 cal/cm$^2$.

4. A process for the manufacture of the multi-layered material according to claim 1, comprising:
    I. preparing a solution of silicone rubber in an organic solvent thereof, adding iron (III) oxide micro-powder, transferring a first half of the so obtained solution in an open container having width and length equal to those of the sample material to be prepared;
    II. positioning in the container of step i) above, a fabric of flame-retardant fibres to cover said first half of the solution;
    III. adding to a second half of the solution obtained in step i) above, glass hollow microspheres, followed by mixing and transferring of the so obtained mixture on said flame-retardant fabric of step ii);
    IV. partially evaporating said organic solvent from said container by air drying;
    V. positioning a fabric of para-aramid fibres to cover the underlying layers, and completing the evaporation of the solvent.

5. An article or a personal protective equipment against arc flash coated by or manufactured with the multi-layered material of claim 1.

6. The article or personal protective equipment of claim 5, consisting of a glove completely manufactured with said multi-layered material.

* * * * *